US005588792A

United States Patent [19]

Tiso

[11] Patent Number: 5,588,792

[45] Date of Patent: Dec. 31, 1996

[54] PIPETTE TIP RACK LOADER

[76] Inventor: Allan Tiso, 879 Del Valle Dr., Fallbrook, Calif. 92028

[21] Appl. No.: 405,083

[22] Filed: Mar. 16, 1995

[51] Int. Cl.[6] .......... B65G 59/06

[52] U.S. Cl. .......... 414/404; 221/93; 221/221; 414/414; 414/786

[58] Field of Search .......... 414/403, 404, 414/414, 786, 331; 221/93, 221, 299

[56] References Cited

U.S. PATENT DOCUMENTS

| | | | |
|---|---|---|---|
| 2,255,036 | 9/1941 | Gedge | 414/404 X |
| 2,385,311 | 9/1945 | Strauss | 221/93 |
| 3,921,369 | 11/1975 | Adams | 221/93 X |
| 3,985,265 | 10/1976 | Sauer | 221/221 |
| 5,181,818 | 1/1993 | Tanaka et al. | 414/414 |

OTHER PUBLICATIONS

VWR Pak Rak Advertising/Information Flyer, Larcon, North America Inc. 1995.

ESP—Environmentally Sensitive Packaging Advertisement, Continential Laboratory Products 1993.

Green–Pak Tip–Rack Refill System Information Brochure, Oct. 1993.

Pipet Tips, Applied Scientific, p. 62, Dec. 1994.

*Primary Examiner*—David A. Bucci
*Attorney, Agent, or Firm*—Baker, Maxham, Jester & Meador

[57] ABSTRACT

An apparatus for loading multiple pipette tips into laboratory storage boxes. The apparatus is principally composed of a dispenser that may be positioned above a box housing a pipette insert-rack. The dispenser is adapted to receive pipette tips from a magazine. The magazine contains multiple stack layers of pipette tips that are arranged one on top of the other. The pipette tips are configured so that each pipette tip can nest its pointed tip through an opening in the collar and inner bore of the pipette tip in the stack layer immediately below. Likewise, each pipette tip may receive the pointed tip of the pipette tip in the stack layer above. In normal operation the tips are transferred from the magazine into the dispenser and then a user may actuate a series of plates in the dispenser to separate the bottom stack layer from the other stacks above it, to allow it to fall downwardly into a storage rack.

23 Claims, 8 Drawing Sheets

PIPETTE TIP RACK LOADER

BACKGROUND OF THE INVENTION

1. Field of the Invention

This invention relates to an item of disposable laboratory apparatus, namely, pipette tips, and in particular to a device for loading and reloading the racks and boxes and related devices used to hold pipette tips for ready dispensing and usage in laboratory procedures.

2. Description of the Related Art

Pipette tips (PT's) and related disposable labware items are used in great quantities in both clinical and industrial laboratories. One way of distributing PT's is in bulk form (1000 tips in a bag, for example). These "bulk" tips can then be manually loaded into storage racks for use in a lab. This is a tedious, time-consuming task typically done by highly paid laboratory personnel. To avoid the loading process, lab personnel may purchase preloaded disposable racks. The conventional configuration of the tip delivery system is a rack having 96 tips arranged in a row and column format (8 rows×12 columns) within a closable box that can be placed in an autoclave or other sterilizing apparatus. These racks are normally sold in cases of ten storage racks, providing 960 tips per case.

In recent years, manufacturers have been under pressure to reduce the cost of disposable goods and, for ecological reasons, the volume of such waste. Many manufacturers and distributors have instituted recycling programs to salvage some of the waste generated by the huge volume of single use racks and boxes. Some have produced special packaging in an attempt to reduce waste. One such design features a reusable box with a disposable rack-insert. This rack-insert is typically a plastic tray having 96 tips arranged in an 8 row by 12 column format. The boxes combined with the rack-inserts are known as "stack racks" because they can be nested one on top of another and they now account for the bulk of current usage. A disadvantage of this manner of usage is that fitting individual rack-inserts in corresponding stack racks can be cumbersome. This design reduces the amount of packaging, but it does little to reduce manufacturing cost because the assembly time is unchanged for the manufacturer, since each tray must be loaded with 96 tips, as was previously done.

Until now, efforts to eliminate single use racks and boxes have produced less than desirable results. In particular, all of the prior art designs still rely on either preloaded disposable trays or the cumbersome method of reloading the trays by hand.

SUMMARY OF THE INVENTION

An objective of the present invention is to provide a mechanism to load pipette tips easily and reliably directly into reusable racks or related devices in a cost and material efficient manner. Another objective of this invention is to provide such a mechanism which requires a minimum of skill, manual dexterity and training to use.

This invention provides an improved device and system for loading pipette tips (PT's) into racks that are made reusable by the invention. The device is adapted to receive PT's from a magazine that is preloaded with a multiplicity of PT's that are stacked in multiple layers. Each layer has a plurality of PT's arranged in a row by column format. The device comprises a dispenser that has at least one plate having multiple apertures arranged to provide passage for the PT's when the stack layers are loaded from the magazine. When the dispenser is actuated under user control, one stack layer is dropped into a positioned storage rack, while the one above it falls into the dropped layer's place. This actuation process, causing the dispensing of one stack layer of 96 PT's at a time, may be repeated until the magazine and dispenser have been emptied and a plurality of storage racks have been loaded.

BRIEF DESCRIPTION OF THE DRAWING

The objects, features and advantages of this invention will be more readily apparent from the following detailed description, when read in conjunction with the accompanying drawing, in which.

DESCRIPTION OF THE PREFERRED EMBODIMENTS

Figure 1A:
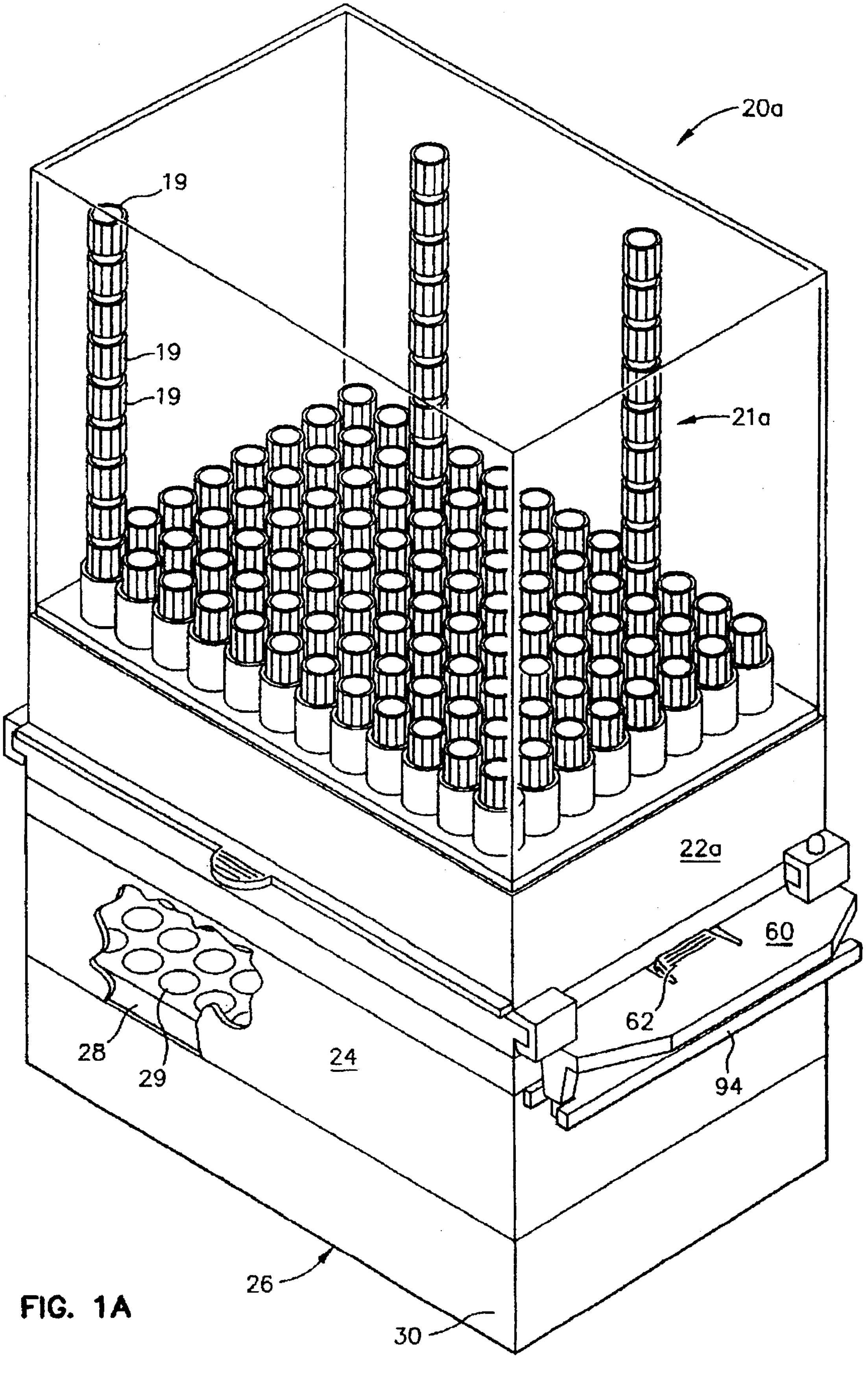
FIG. 1A is a perspective view of the pipette tip rack loading device of this invention with one embodiment of an attached magazine, together with a storage rack.

With reference now to the drawing, wherein like reference numerals designate like or similar parts throughout the similar views, there is illustrated in FIG. 1A loading assembly **20*a* for loading a plurality of pipette tips (PT's) 19 into positioned pipette tip (PT) storage rack 26. Storage rack 26 employs a box 30 which holds the rack-insert 28. Regarding terminology, the term "storage rack" refers to any well-known storage container for pipette tips having PT-receiving apertures, whether or not it has a removable or integrally attached insert. Therefore, the rack-insert 28 may be removable or integrally attached. This loading device is useful for simultaneously loading every insert aperture 29 in rack insert 28 with a single pipette tip 19 in an automatic fashion. Loading assembly 20***a* includes magazine 22*a* for holding a plurality of pipette tips until the tips are passed into a coupled loading device or dispenser 24. Dispenser 24 is adapted to be easily positioned above a typical prior art storage rack, such as rack 26. The storage rack can be automatically filled by the action of a user pressing actuator button 62 followed by moving an attached separator plate 60 in a lateral direction. The lateral movement of separator plate 60, coupled with resulting movement of escapement plate 94, causes a sufficient number of pipette tips to fall, in an array of a "stack" layer of single PT's, filling every insert aperture in rack insert 28 of storage rack 26.

Figure 2A:
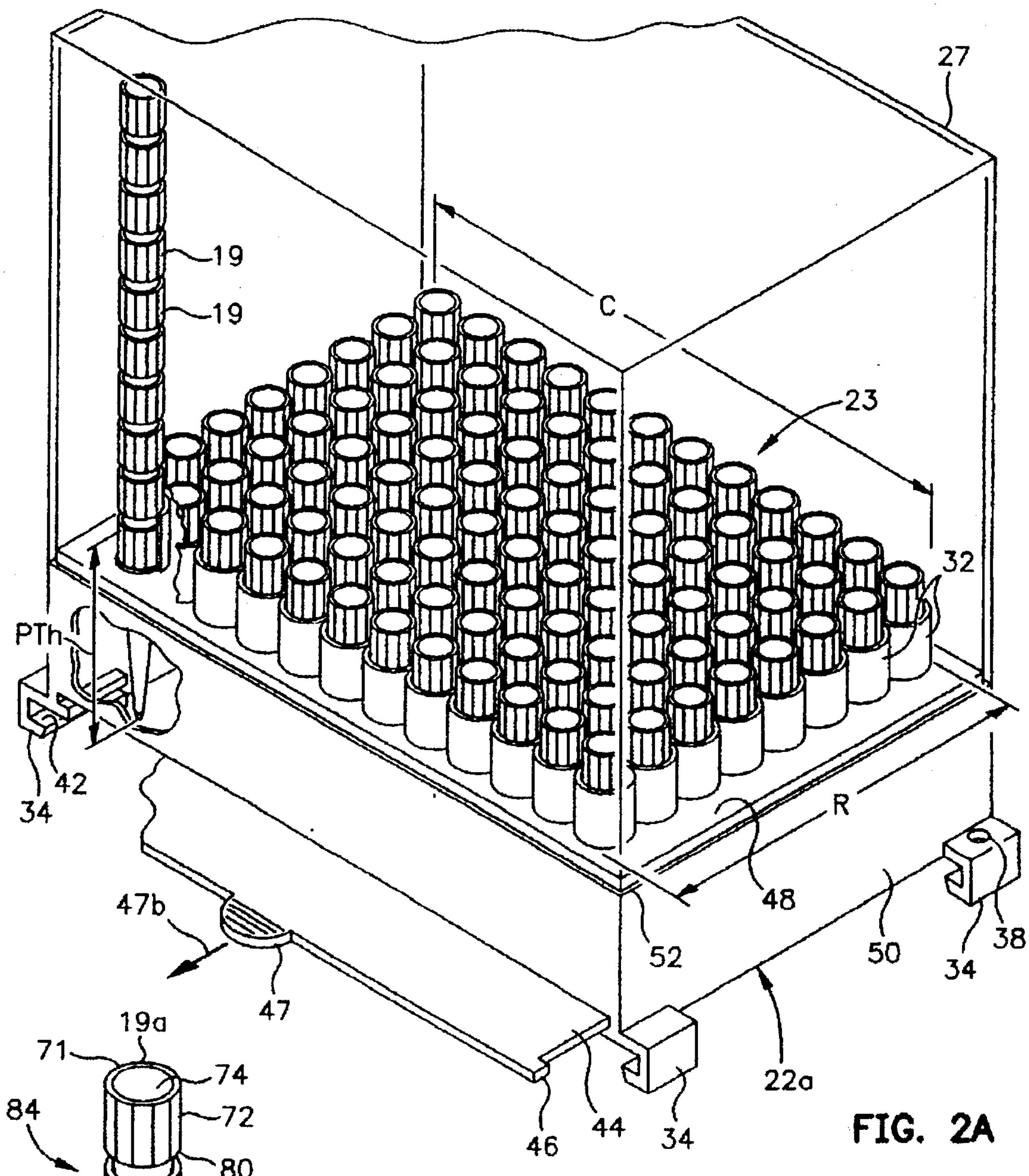
FIG. 2A is a partially cut-away perspective view of the magazine of the embodiment shown in FIG. 1A.

In FIG. 2A, magazine 22*a* is shown detached from the dispenser. The magazine consists of housing base 50 that is integrally attached to magazine locks 34 and supporting ledge 42. Ledge 42 supports PT retainer plate 44. When a user pulls PT retainer plate 44 by means of handle 47 in direction 47*b*, the pipette tips fall downward into corresponding apertures in the dispenser. It is envisioned that once plate 47 is removed, it will not be replaced. Mechanical stops 46 are used for positioning plate 47 during manufacturing. The magazine is preferably provided with clear plastic enclosure 27 for protecting the multiplicity of pipette tips contained therein. However, it is easily recognized that the enclosure is entirely optional and does not affect the operation of the invention. Preferably, support ledge 52, which is part of magazine housing base 50, supports enclosure 27. PT support cylinder plate 48, which holds a plurality of PT support cylinders 32, also rests on ledge 52. The support cylinders are arranged in rows, designated as R, and in columns, designated as C. This row and column cylinder format matches the storage rack configuration. Since typical rack insert 28 can accommodate 96 pipette tips arranged in an 8 row by 12 column format, it is preferable that this format be matched by the PT support cylinders.

FIG. 2A also shows that housing base 50 is deep enough to allow one pipette tip 19 to pass partially through while the remainder of the tip is supported in cylinder 32. The height of a pipette tip 19 is represented schematically as PTh. A PT stack layer 23 of height PTh comprises a plurality of PT's arranged in a single rectangular layer. Each pipette tip 19 is configured to be able to nest into an adjacent pipette tip at one end and to receive a nesting pipette tip in the opposite end. The nesting configuration allows for a minimum amount of space to be taken up by magazine 22 since the prior art provides for cases of 960 tips. This nesting configuration will be discussed in more detail below. Nesting the pipette tips allows for a plurality of stack layers, each stack layer having the height of one pipette tip, PTh. In a preferred embodiment there are 96 PT's in a PT stack layer. Of course, the number of PT's in a stack layer is chosen to correspond to the number of PT's that a storage rack holds and can therefore be changed without departing from the spirit and purpose of the invention. For the sake of simplicity, each stack layer which can be accommodated by the magazine 22*a* is not shown. However, in a preferred embodiment 10 stack layers may be accommodated to allow for 960 PT's to be stored in magazine 22*a* for dispensing. It can also be appreciated by those skilled in the art that the number of stack layers can easily be varied without departing from the spirit of the invention. It is recognized that this number is a convenient choice.

Each PT 19 is nested into another PT 19 to form nested column 21*a* of PT's (FIG. 1A). Preferably, there are as many PT nested columns as there are PT support cylinders. Each nested column will fall through apertures in the dispenser. A series of apertures in the dispenser collectively form a passage path through the dispenser. The dispenser has means to separate individual pipette tips from nested columns so that only one stack layer at time can pass into a positioned storage rack 26.

Figure 1B:
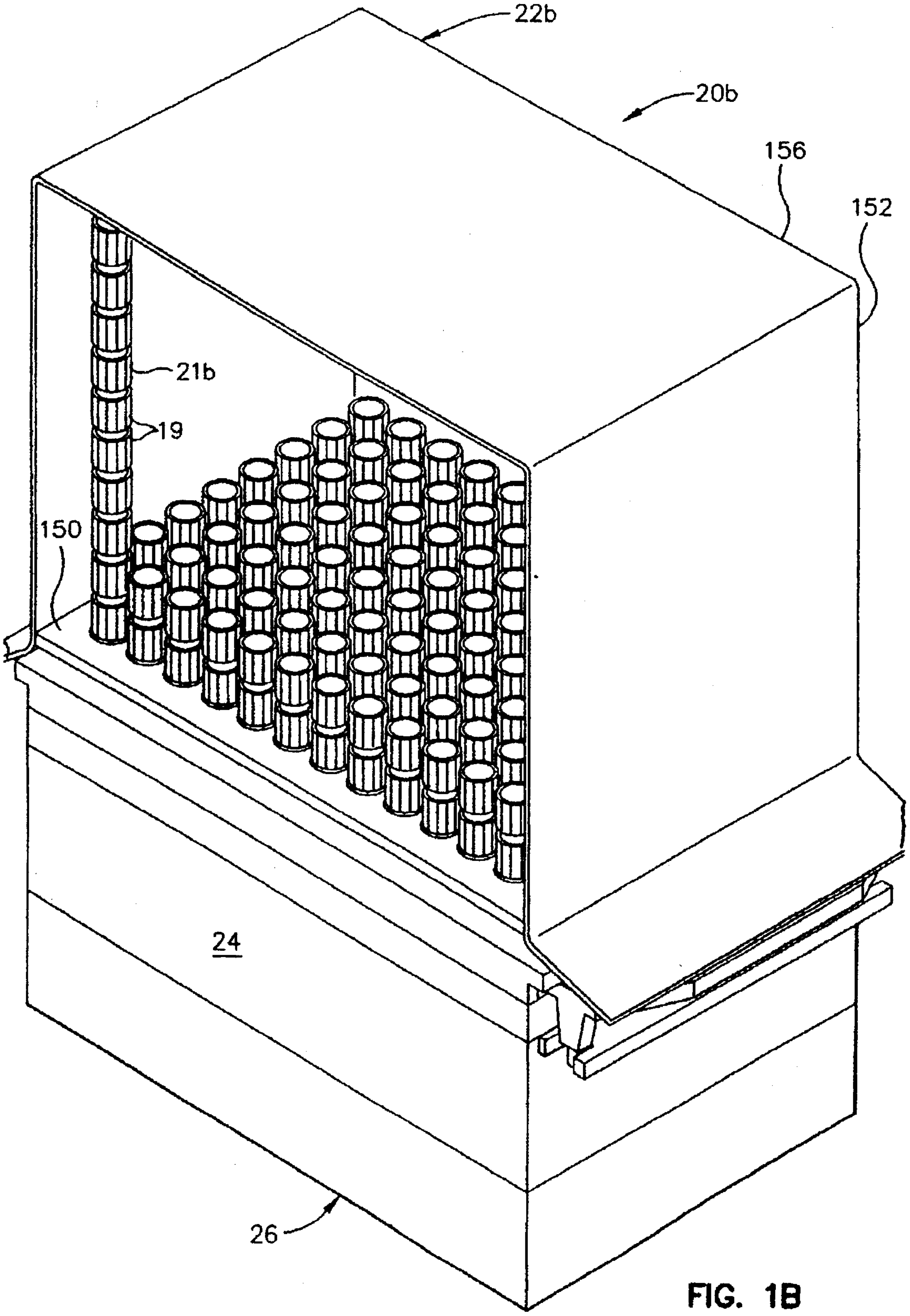
FIG. 1B is a perspective view of the pipette tip rack loading device of this invention with another embodiment of a magazine together with a storage rack.
Figure 2B:
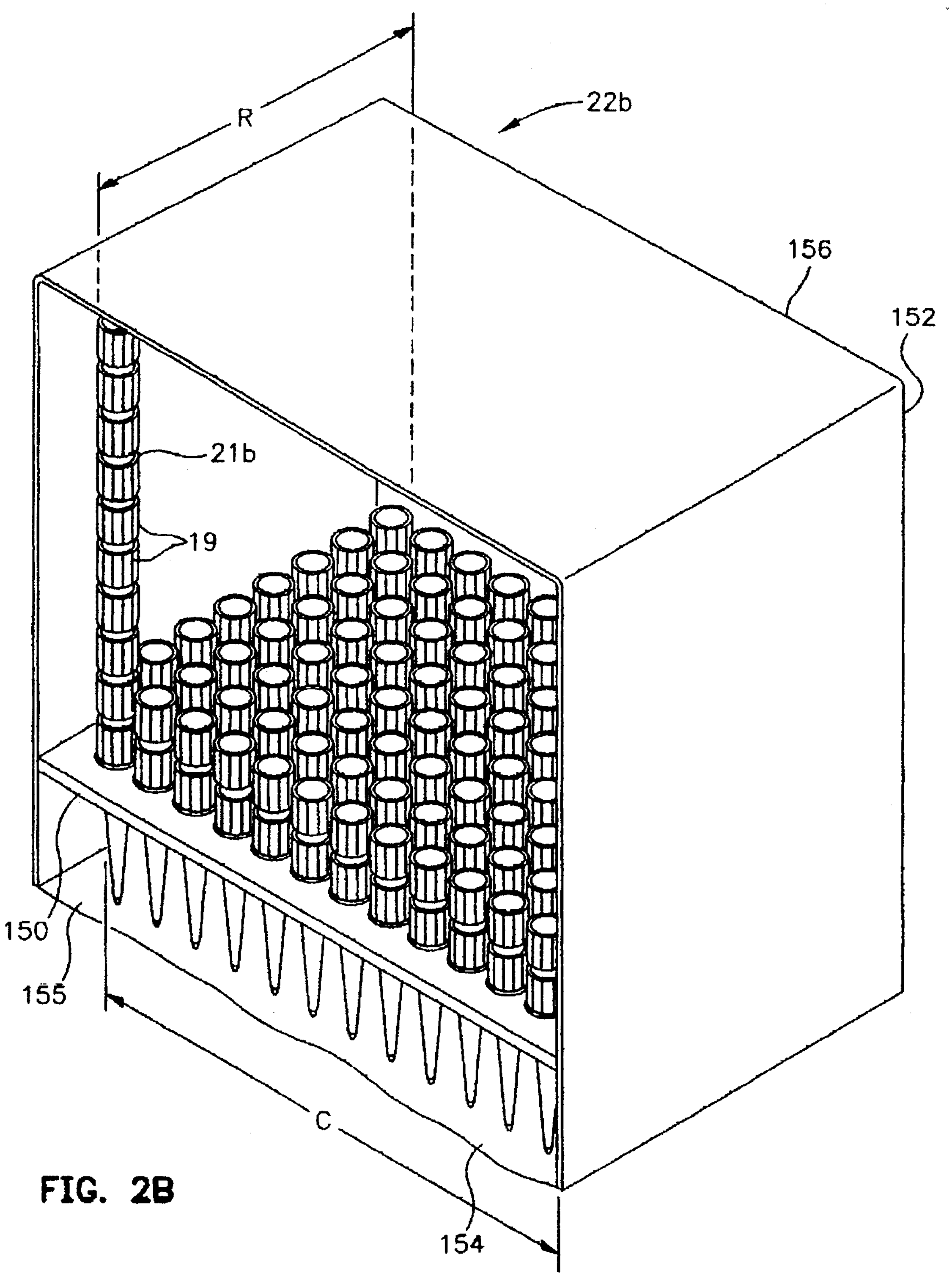
FIG. 2B is a partially cut-away perspective view of the magazine of the embodiment shown in FIG. 1B.

It can be seen in FIGS. 1B and 2B, that loading assembly 20*b* comprises the loading dispenser 24 combined with pipette tip nested columns 21*b* loaded from magazine embodiment 22*b* (shown in FIG. 1B with outer light-weight cover 154 (FIG. 2B) removed). It can be appreciated by those skilled in the art that this alternative embodiment lends many possibilities to ways that the device may be sent to an ultimate user. For example, the dispenser may be provided by itself, separated from either magazine embodiment. In such a situation, a magazine can also be provided separately. For another example, the dispenser may be provided coupled with a magazine of the embodiment shown in FIG. 1B (such a coupled pair being shown in FIG. 1A). Once the PT's from that magazine are spent, then replacement PT's may be provided from a magazine of the embodiment illustrated in FIG. 2B. However, it should be clear that the particular choice for a configuration of the magazine is not an important aspect of the invention.

The pipette tips may be sent to the user in magazine 22*b* comprising a three-sided (open bottom and sides) semi-rigid container 152 as seen in FIG. 2B. A suitable choice for the semi-rigid material of composition is light-weight cardboard. To seal the PT's from the outside environment, container 152 is preferably enclosed in a light-weight covering material 154, such as clear cellophane. This embodiment of the magazine comprises a multiplicity of pipette tip stack layers having a rigid positioning plate 150 with a sufficient number of apertures to allow the multiple PT columns to pass through. The preferred material for the plate is plastic. Preferably plate 150 is securely attached to container 152. The primary purpose of the plate is to align the various columns so that they pass without encumbrance into dispenser 24.

It is envisioned that the cellophane can easily be peeled away and removed to expose a bottom opening 155, formed opposite top 156. The user may place PT's in the dispenser by inverting both the magazine and dispenser 24 and the dispenser placed over the bottom opening of the magazine so that each aperture of top plate 54 (see FIG. 4A) of the dispenser accepts the PT columns. Plate 150 serves to assure that alignment is retained during the mating of the magazine and dispenser. Once they are mated, both can be turned upright so that the multiplicity of PT's fall downward from the magazine and into the dispenser.

Figure 3:
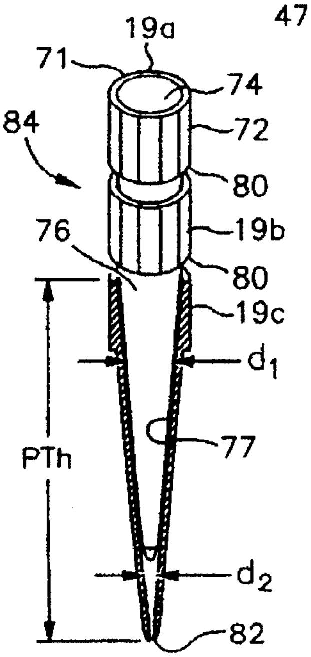
FIG. 3 is a partial sectional perspective view showing the geometry of a pipette tip, especially configured for the invention, allowing the tips to nest within each other to facilitate use with the loading device of FIGS. 1A and 1B.

Referring to FIG. 3, nested PT assembly 84 is shown to illustrate the novel configuration of the pipette tips which saves space and enables the operation of the present invention. Nested PT assembly 84 is simply a small portion of either nested column 21*a* or 21*b*. Three exemplary PT's 19 are illustrated as PT 19*a*, 19*b* and 19*c*. PT 19*b* is shown having its body 76 nested in an inner bore 77 of PT 19*c*. Each pipette tip has a collar 72 having a lower annular shoulder 80 that is useful for operative engagement with a separator means, as will be discussed in more detail below. Further, PT 19*b* has an opening in which can be placed the body 76 of PT 19*a*. In a similar fashion, the body of PT 19*a* nests into an inner bore (not shown) of PT 19*b* and top opening 74 is shown, available to receive the body of another PT. This nesting configuration allows a multiplicity of PT's to fall in unison, and in a straight path. The nesting configuration further offers the advantage of compressing the amount of space required for the PT's. Other advantages of the nesting configuration will be understood with reference to a more detailed description below, and in particular with reference to FIGS. 5A–5C, 6A–6C, and 7A–7C.

The novel pipette tip 19 of the present invention differs from prior art pipette tips because of its unique geometry which enables the nesting capability discussed above. Prior art pipette tips are not designed to be nested because there has been no prior motivation for enabling such a nesting configuration. The prior art teaches away from a nesting configuration because prior art manufacturing techniques require that each PT be formed and handled separately from other PT's so that the PT's can then be sold in a bulk bag for individual insertion in a rack insert tray. Alternatively, in the prior art, the PT's are placed in a tray before shipping to a customer, but this still requires that the PT's be separated during manufacturing. Body 76 of PT 19 has a decreasing diameter from the end proximate to the collar to the distal end at opening 82, designed for normal pipette tip operation. For example, diameter $d_1$ is larger than the diameter $d_2$ that is measured closer to opening 82. This decreasing diameter configuration facilitates the nesting capability.

Figure 4B:
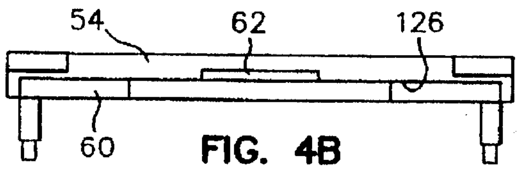
FIG. 4B is a side view of the top plate with the separator plate showing their relationship when aligned to enable operation of the loading device of FIGS. 1A and 1B.
Figure 4A:
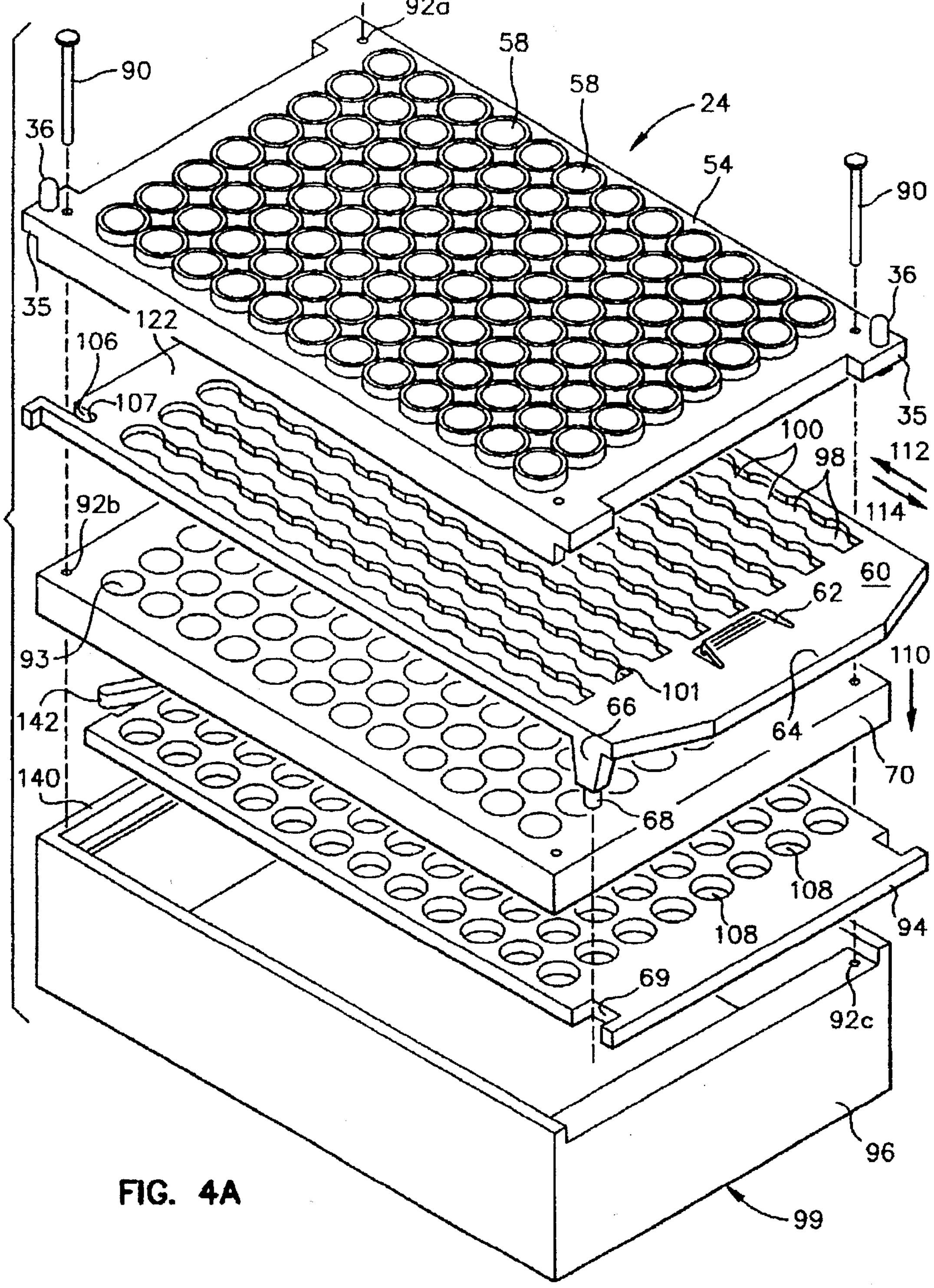
FIG. 4A is an exploded perspective view of the loading device of FIG. 1A and 1B.

A more detailed description of dispenser 24 is shown in FIGS. 1A, 2A and 4A. Magazine guide 36 disposed on top plate 54 of the dispenser is adapted to be placed through hole 38 in magazine lock 34. Two magazine guide pins 36 are shown for the sake of simplicity. However, their number may be varied without departing from the spirit of the invention. Once guide pins 36 have been placed through holes 38, magazine 22 may be coupled to dispenser 24 by flexing the material of housing 50 to allow magazine locks 34 to snap over and engage the magazine mounting tabs 35 on the dispenser. Through-holes 92*a* in top plate 54 allow fasteners 90 to fixedly engage the top plate to transfer alignment plate 70 and to dispenser bottom base piece 96 through respective through-holes 92*b* and 92*c*. It is preferable to make the top plate and alignment plate wider than the moving escapement plate and the moving separator plate so that the fasteners 90 can simply fit outside of these moving plates.

Figure 8:
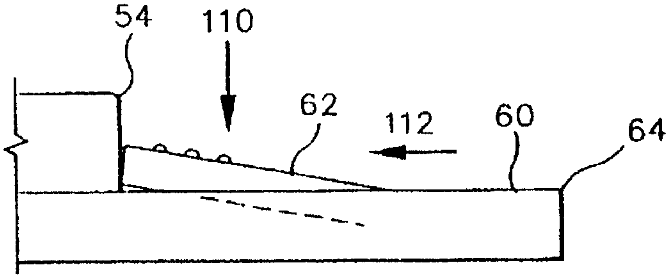
FIG. 8 is a partial side view of the actuator feature of the separator plate in an operating relationship with the top plate of the dispenser of FIGS. 1 and 4A.

Referring to FIGS. 4A, 4B, and 8, the relationship of plates 54, 60 and 94 with regard to actuating the dispensing of pipette tips is shown. Together, multiple layers or plates 54, 60, 94, form a PT passage structure. Once these three plates are aligned and joined, the spacing between each plate provides for the placement of separator plate 60 and escapement plate 94 in an arrangement that is fixed in a vertical direction but allows for sliding movement in a horizontal or lateral direction. Separator plate 60 is configured to slide in channel 126 (FIG. 4B) disposed in the underside of top plate 54. The separator plate has actuator button 62 which is of greater height than recess channel 126 in a non-compressed state so that the separator plate cannot be moved laterally without the displacement of button 62. The escapement plate is engaged at slot 69 by actuator pin 68 which depends from actuator 66 on the underside of separator plate 60. The interaction of the separator plate and the escapement plate is an important aspect for implementing the present invention and will be discussed in greater detail below. The movement of separator plate 60 controls the movement of escapement plate 94, and the escapement plate, in turn, controls the movement of PT's into the storage rack.

FIG. 4A shows that each plate in dispenser 24 is configured with through-apertures to allow for the passage of PT's into a storage rack which is preferably positioned below bottom base piece or frame 96 at its underside 99. Thus, top plate 54 is configured with through-apertures 58 arranged in row and column format. In a similar fashion, transfer plate 70 is formed with through-apertures 93, and escapement plate 94 is configured with through-apertures 108. When transfer plate 70 is added it becomes part of the PT passage structure. Each of the above described apertures in a fully open position permits passage of a PT stack layer 23. Thus, the above described apertures form a PT passage path, that can be selectively opened and closed. The path is internally located in the passage structure.

Separator plate 60 is also fashioned with through-apertures 98. However, each of these apertures is adjacent to and connected by open-slotted portion 100 having walls 101 configured with means to separate one PT stack layer 23 from the PT stack layer positioned immediately below it. The separating means will be discussed, in detail, below. The separator plate is adapted to be slid by a user in lateral direction 112, and then in reverse direction 114. Escapement plate 94 is forced to move when separator plate 60 is moved by an operator because the two plates are coupled together by the actuator pin engaging the receiving slot 69. Base piece 96 has stop wall 140 for intercepting integral leaf springs 142 of plate 94. When plate 94 is slid in direction 112 the springs are compressed, biasing the plate in the direction of arrow 114. Release of pressure in direction 112 allows spring elements 142 to move plate 94 in direction 114. This spring force prevents the PT's from becoming stuck in the PT passage path, in the event of a pause by the user between a transition from direction 112 to direction 114.

During the movement, described above, transfer alignment plate 70 is maintained in the stationary position so that it will allow the passage of a multiplicity of PT's in a PT stack layer or array. But escapement plate 94 is adapted to allow a PT stack layer to fall through only when its apertures 108 are properly positioned by interaction with moving separator plate 60. The interaction that moves the escapement plate with the separator plate is caused by actuator pin 68 exerting a force against the edge of slot 69.

Figure 5A:
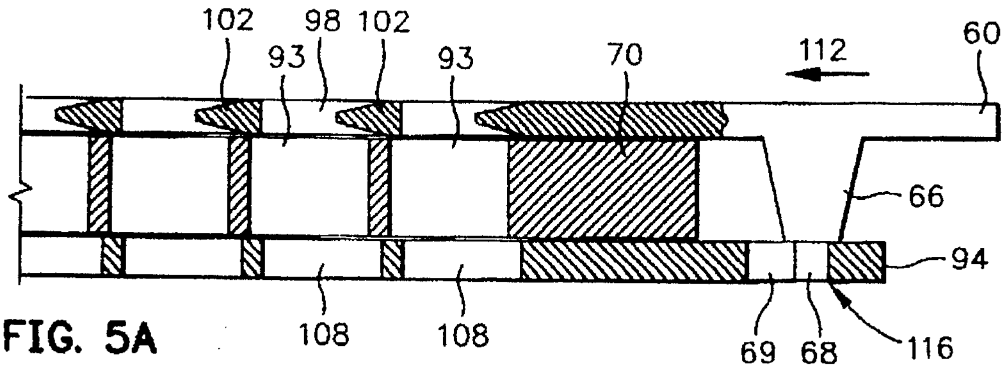
FIGS. 5A, 5B, and 5C are enlarged sectional views illustrating the alignment interaction of the separator plate, transfer alignment plate, and escapement plate of the loading device of FIGS. 1A, 1B and 4A.
Figure 5B:
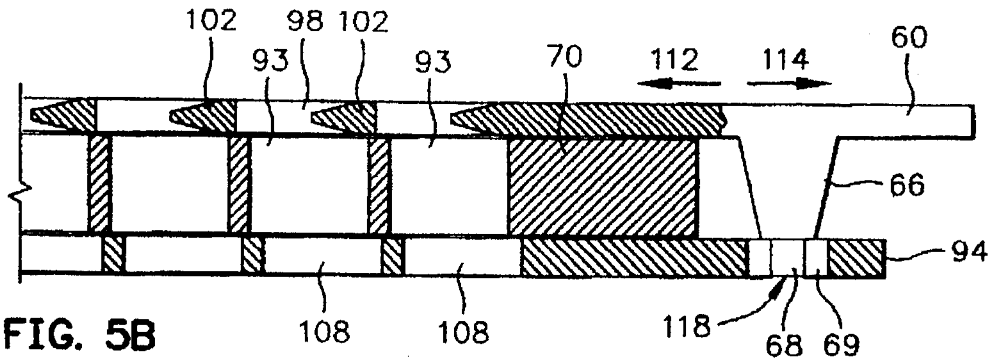
Figure 5C:
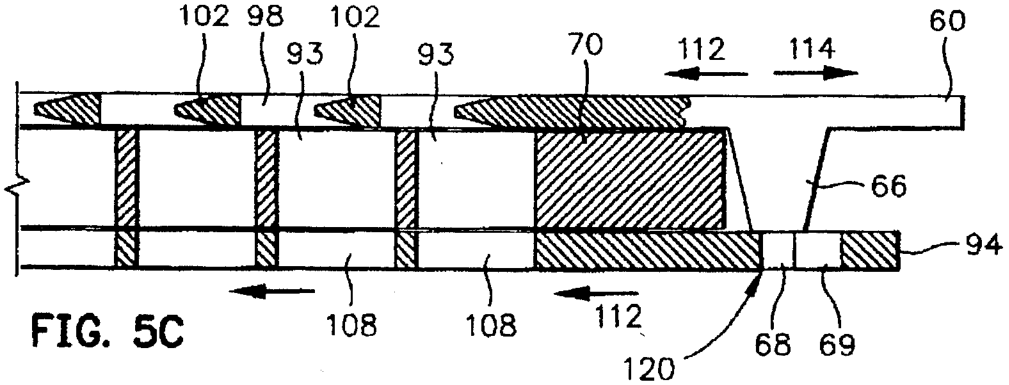
Figure 6A:
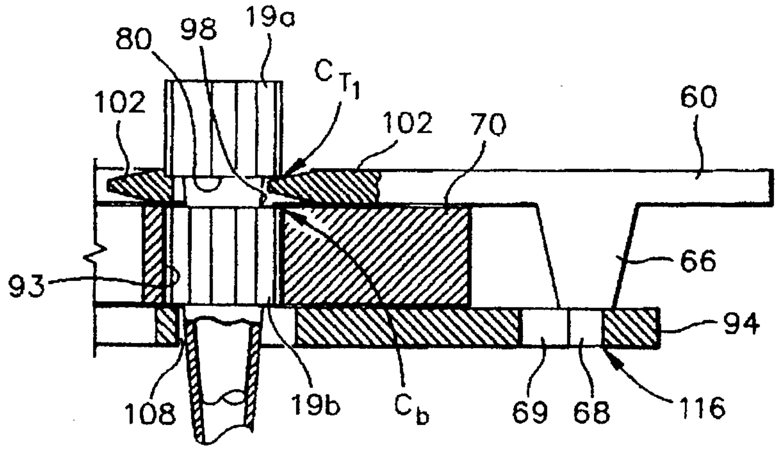
FIGS. 6A, 6B, and 6C are enlarged sectional views of the alignment interactions shown in FIGS. 5A, 5B, and 5C, and including nested pipette tips in the configuration shown in FIG. 3.
Figure 6B:
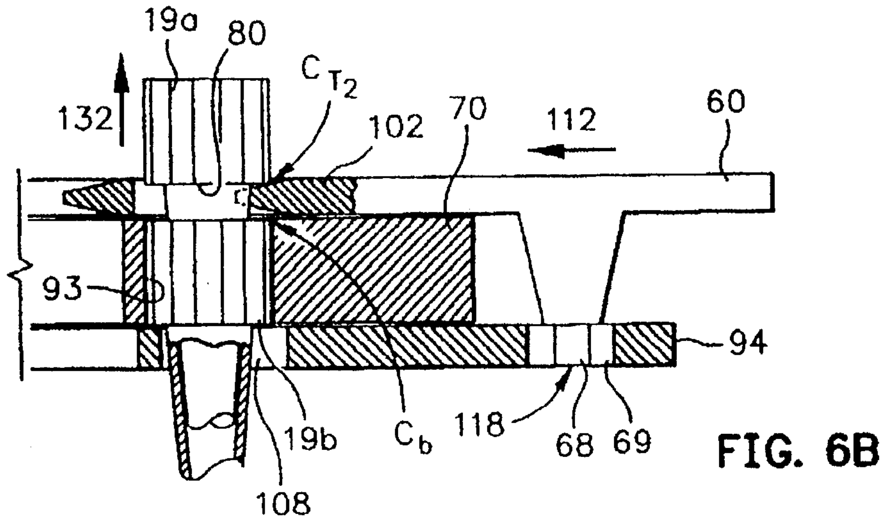
Figure 6C:
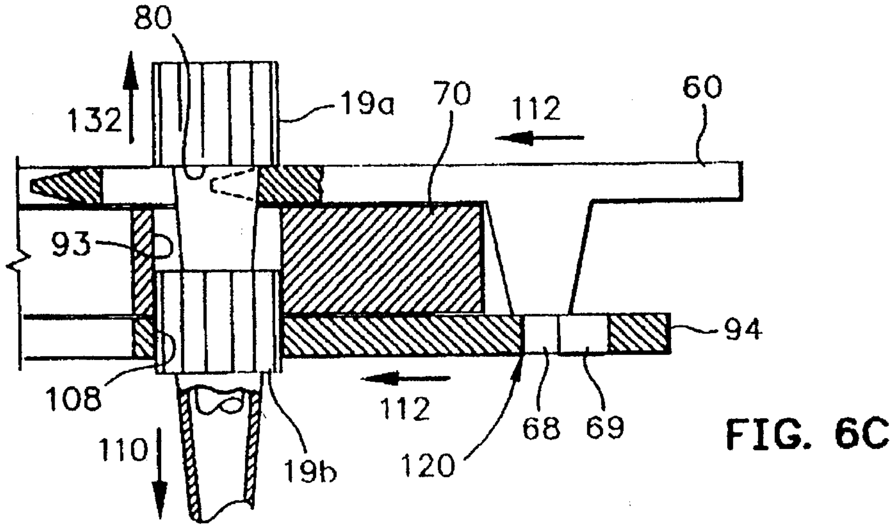
Figure 7A:
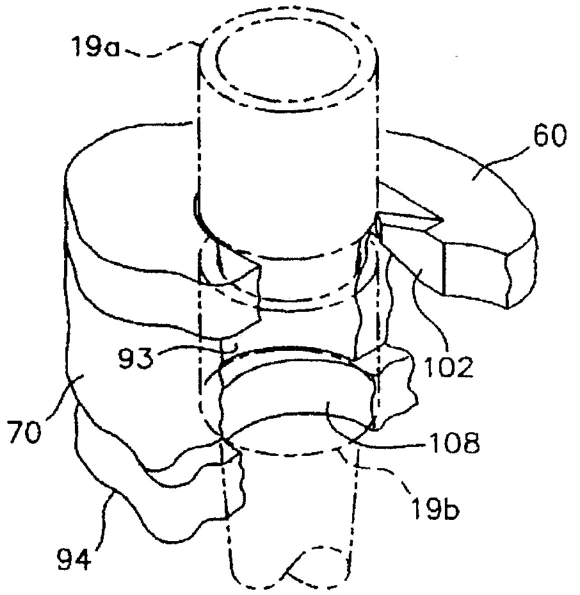
FIGS. 7A, 7B, and 7C are partially cut-away perspective views of nested pipette tips in the configuration shown in FIG. 3 being separated by pipette tip separator means that are useful during the alignment interaction shown in FIGS. 5A, 5B, 5C, 6A, 6B, and 6C.
Figure 7B:
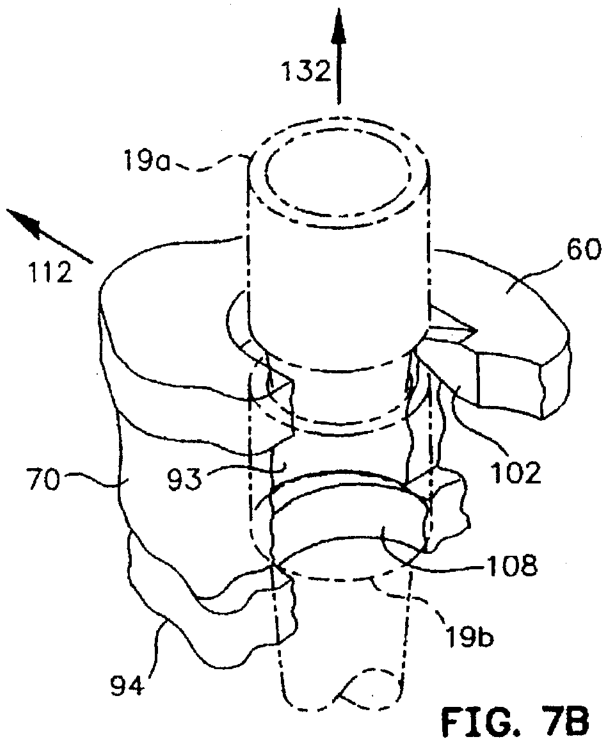
Figure 7C:
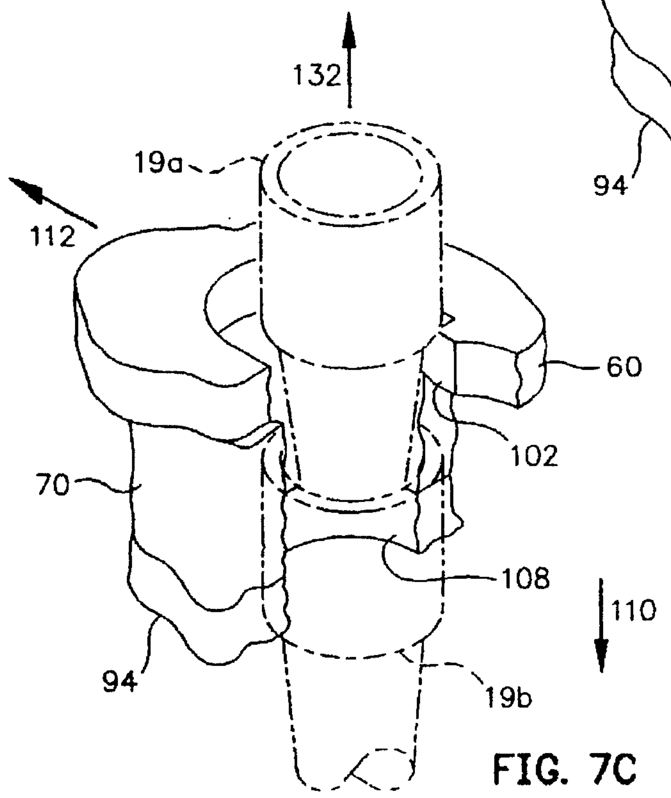

The separating and dropping of a stack layer 23 of height PTh into a positioned storage rack 26 is shown in FIGS. 5A–5C, 6A–6C, and 7A–7C, wherein each figure sequence represents consecutive steps in the operation of the loading device. FIGS. 5A–5C show a simplified overview of the interaction of separator plate 60, transfer alignment plate 70, and escapement plate 94. For the sake of simplicity the pipette tips are not shown here. FIGS. 6A–6C show an overview of the interaction sequence represented in FIGS. 5A–5C, and also includes wedging separator means 102 and pipette tips in a nested configuration placed through the apertures in each plate. FIGS. 7A–7C show the same sequence as that shown in FIGS. 5A–5C and 6A–6C but in partially cut-away perspective views illustrating the separator means.

A simplified overview of the interaction of separator plate 60, transfer alignment plate 70, and escapement plate 94 is shown in FIGS. 5A and 8. In FIG. 5A, actuator pin 68 engages slot 69 and is shown in start or resting position 116. With reference to FIG. 8, when actuator button 62 of separator plate 60 is pushed downward in direction 110, the separator plate may be moved by the operator in lateral direction 112 by applying a lateral force in that direction at end position 64. This allows the separator plate to slide in recess channel 126 (FIG. 4B) beneath top plate 54. Returning once again to FIG. 5A, the positions of alignment aperture holes 93, 98 and 108 in the starting position are shown and should be noted for comparison to their changing positions as plate 60 is moved in direction 112. The changing positions are discussed below with reference to FIGS. 5B and 5C. Aperture 108 of escapement plate 94 is shown slightly out of alignment with transfer alignment plate 70 because this is the preferred starting arrangement. This will prevent a PT stack layer from falling into the storage rack before a user actuates the sliding action described above.

When plate 60 is moved in lateral direction 112, actuator pin 68 moves to position 118 (FIG. 5B). As plate 60 continues moving toward position 120, separator plate 60 causes plate 94 to move in direction 112. This causes leaf springs 142 to be compressed against wall 140. This series of movements action completes the near-concentric alignment of apertures 98 and 108. Eventually, as the separator plate is moved in direction 112, the collision of end point 107 of slot 106 with fastener 90 (see FIG. 4A) serves to prevent further movement of plate 60. When this happens, actuator pin 68 is in the shown corresponding stop position 120, and apertures 108 are in the shown position of near concentric alignment with transfer alignment apertures 93. It is this alignment of aperture 93 with aperture 108 combined with the movement of separator means 102 that causes a PT stack layer to drop downwardly.

Separator means 102 separates a pipette tip from the other pipette tips in a nested column in a manner that is described below, with reference to FIGS. 6A–6C, and 7A–7C. The separation of each pipette tip in a nested column, in effect, creates a detached stack layer that is free to fall through aperture 108 when it is in alignment with aperture 93. When plate 60 is then forced by the operator in lateral direction 114 opposite to direction 112, the actuator pin returns to resting position 116, completing the return movement of plate 94, and the next adjacent PT stack layer above has its downward travel path blocked once again by the edges of apertures 108 in escapement plate 94.

For the sake of clarity, this same operation sequence is illustrated with more detail in FIGS. 6A–6C, which include two pipette tips in the nested configuration. FIG. 6A shows the starting position of separator plate 60 and escapement plate 94 on either side of plate 70. Point $C_{T_1}$ shows the resting point of annular shoulder 80 of the collar of pipette tip 19*a*, and point $C_b$ shows the resting point of the top collar near the opening of pipette tip 19*b*. Note that part of annular shoulder 80 of pipette tip 19*a* is resting on the separator means 102. Note, also that the annular shoulder 80 of pipette tip 19*b* is resting on escapement plate 94 so that the PT stack layer positioned at the lowest position cannot fall into the storage rack positioned below. FIG. 6B shows the same sequence as FIG. 5B. Pipette tip separator means 102 serves to push PT 19*a* upward in direction 132 when plate 60 is moved in direction 112. During this particular sequence, the position of annular shoulder 80 of PT 19*a* moves to the position $C_{T_2}$, which is higher than position $C_{T_1}$. Even though the pipette tips are separated, the downward passage of pipette tip 19*b* continues to be blocked by escapement plate 94 during this sequence.

As actuator pin 68 reaches the end of the stroke (FIG. 6*c*), actuator pin 68 engages the front of slot 69 at position 120, moving plate 94 in direction 112 and aligning openings 93 and 108. At the same time, the downward movement in direction 110 of pipette tip 19*a* is blocked by wedging or separator means 102 of separator plate 60. However, pipette tip 19*b* freely travels downward to a storage rack 26 because aperture 108 has been moved to near perfect alignment with aperture 93 of transfer plate 70.

The partial cut-away perspective views of FIGS. 7A–7C illustrate the action of the separator means 102 during the above-described operating sequence. Pipette tips 19*a* and 19*b* are shown in phantom lines for the sake of clarity. FIGS. 7A–7C correspond to the sequence illustrated in FIGS. 6A–6C, respectively. Referring to FIG. 7A, pipette tip 19*a* is resting on separator means 102 which is attached to separator plate 60. It is nested into pipette tip 19*b*. Pipette tip 19*b* passes through aperture 93 in plate 70, and partially through aperture 108 in plate 94. In FIG. 7B, pipette tip 19*a* is pushed upward in direction 132 by separator means 102 as plate 60 is pushed in direction 112. Pipette tip 19*a* moves further away from pipette tip 19*b* which remains in the same position in aperture 93 of plate 70 and in aperture 108 of plate 94. The final phase of the sequence is shown in FIG. 7C. As plate 60 is further moved in direction 112, pipette tip 19*a* completes its upward movement in direction 132 because of the separating force applied by the wedge or separator means 102. Pipette tip 19*b* is shown falling downward in direction 110 through aperture 108 in plate 94, as explained above with reference to FIGS. 5C and 6C.

Generally, the PT separator means 102 separates nested PT's from adjacent stack layers and the movement of the escapement plate allows the lowest positioned PT stack layer to drop into a positioned PT storage rack. However, a return to starting position 116 by a user moving plate 60 in direction 114, causes a blocking of movement downward of a PT stack layer (see FIG. 6A). This cyclic return to the starting position allows the loading device to be repositioned at another PT storage rack for continued loading of one PT stack layer at a time. This process may be repeated until there are no remaining PT's in the magazine and the dispenser.

From the description above it can be appreciated that the present invention provides a mechanism which loads pipette tips easily and reliably directly into storage racks. Further, the actuating action of dropping a PT stack layer requires a minimum of skill, manual dexterity and training. The present invention eliminates waste because storage racks may be reused many times, and it is envisioned that the dispenser mechanism may be reused several times as well. The present invention offers environmental advantages over the prior art and reduces costs in manufacturing. It is believed that this is a pioneering invention solving many critical problems for the pipette-using industry and provides a solution vastly different from anything known previously.

In view of the teachings above, it is possible that modifications and improvements may occur to those skilled in the applicable art which are within the spirit and scope of the appended claims. For example, while the presently preferred arrangement used by the applicable industry is the rectangular row and column configuration described above, the invention is not limited to such a geometric structure. Accordingly, the present invention is not to be limited except by these claims.

What is claimed is:

1. A dispenser for dispensing pipette tips downwardly under the force of gravity, said dispenser comprising:

a frame having a top end and a bottom end spaced from said top end;

means in said dispenser defining an interruptible tip passage path;

a top plate coupled to said top end of said frame, said plate being formed with a plurality of apertures therethrough, each said aperture being adapted to receive a plurality of tips in a mutually nested stack, the bottom tip in the stack of tips extending through said aperture, said apertures defining the top portion of said tip passage path;

means below said top plate cooperative with the shape and configuration of each tip to selectively prevent the tips from passing completely through said apertures in said top plate and out the bottom end of said frame;

means for wedging apart the bottom tip from the next upper tip nested in the bottom tip by retaining in position the bottommost tip while moving the remainder of the stack of tips apart therefrom; and means for selectively permitting the bottom tip to pass completely through said tip passage path and fall independently from the remaining tips in the nested stack through said aperture and out the bottom end of said frame, said wedging means being shaped and configured to retain the remaining tips in the nested stack in said aperture in said top plate when the bottom tip passes out the bottom end of said frame.

2. The dispenser recited in claim 1, and further comprising means for storing and transferring a multiplicity of tips arranged in a plurality of mutually nested, parallel stacks of tips, said storing and transferring means being engaged with the top end of said frame and adapted to load said top plate with a stack of nested tips in each said aperture.

3. The dispenser recited in claim 2, wherein said plurality of nested stacks of tips are arranged in a regular rectangular matrix of rows and columns, there being a nested tip stack at each intersection of a row and column, so that when the apertures in said top plate are occupied by the bottom tip in each stack of nested tips, a plurality of tip stack layers are formed, each layer comprising a matrix of a plurality of tips in a plane.

4. The dispenser recited in claim 3, and further comprising a tip storage rack residing beneath the bottom end of said frame, said storage rack having a like plurality of apertures, said dispenser feeding a single tip into each storage rack aperture upon actuation of said wedging means and said means for permitting the bottom tip to fall through and out of said tip passage path.

5. The dispenser recited in claim 1, and further comprising a tip storage rack residing beneath the bottom end of said frame, said storage rack having a like plurality of apertures, said dispenser feeding a single tip into each storage rack aperture upon actuation of said wedging means and said means for permitting the bottom tip to fall through and out of said tip passage path.

6. The dispenser recited in claim 4, wherein the tip passage path is formed of multiple layers of elements, each said element having a plurality of apertures, the multiple layers of elements forming layers of apertures, the layers of apertures forming the internal tip passage path, each layer of apertures being arranged in a row and column format that corresponds with the row and column format of the tip stack layers, the path being adapted to allow for the passage of one tip stack layer at a time through the layer of apertures into a positioned said tip storage rack until there are no tips remaining in said top plate apertures.

7. The dispenser recited in claim 6, wherein said tip dispenser comprises means so shaped and configured that when one tip stack layer is dispensed in a said positioned tip storage rack, the tip stack layer being located adjacently above the one dispensed tip stack layer automatically falls into a position that has been occupied by the one dispensed tip stack layer.

8. The dispenser recited in claim 7, wherein said dispenser further comprises:

at least one tip, each tip having a body with an inner bore extending longitudily therethrough, an opening at a first end, an annular collar surrounding said opening at said first end, an opening at a second end, the body being integrally connected between said first and said second ends, said body having a diameter which decreases from said first end to said second end;

each said tip being configured so that each said tip in a stack layer can receive the body of a tip having the same row and column indices in a tip stack layer located adjacently above, wherein said body is received through said opening proximate said collar; and each said tip being further configured so that each tip in a tip stack layer can nest its said body through said opening proximate said collar and into said inner bore of the tip having the same row and column indices in a tip stack layer located adjacently below.

9. The dispenser recited in claim 8, wherein the multiple layers of elements of the tip passage path of the dispenser comprise:

said top plate being substantially flat for communicating with said means for storing and transferring a multiplicity of tips, said top plate having a corresponding aperture for each tip stack layer of the plurality of tip stack layers, said top plate being disposed so that it is essentially parallel to each transverse plane through each tip stack layer of the plurality of tip stack layers;

an escapement plate located below said top plate and being essentially parallel to said top plate, said escapement plate having a corresponding aperture for each tip stack layer;

a separator plate including said wedging means, said separator plate being located between said top plate and said escapement plate and extending essentially parallel to said top plate, said separator plate having a corresponding aperture for each tip stack layer; and a depending coupling member on said separator plate, said coupling member being attached at one end to said separator plate and at the other end engages said escapement plate, so that when said separator plate is moved in a lateral direction said escapement plate is forced in the same direction as said separator plate, while said top plate remains stationary.

10. The dispenser recited in claim 9, and further comprising tip separator means mounted on said separator plate so that when said separator plate is moved in a lateral direction, said tip separator means separates nested tips from adjacent stack layers and said escapement plate moves into a position to allow the bottom tip stack layer to drop into said positioned tip storage rack.

11. The dispenser recited in claim 9, wherein said coupling member comprises an actuator pin integrally attached at one end to said separator plate and a slot for receiving the other end of said actuator pin, the slot being integrally contained in said escapement plate.

12. The dispenser recited in claim 10, wherein said tip separator means comprises said wedging means that is located adjacent to each aperture in said separator plate.

13. The dispenser recited in claim 10, wherein the multiple layers of elements of said passage path further comprise a substantially flat stationary transfer alignment plate having a corresponding aperture for each tip stack layer, said transfer alignment plate being essentially parallel to said top plate and being located between said separator plate and said escapement plate to guide and support a tip stack layer through the corresponding apertures in said escapement plate.

14. The dispenser recited in claim 2, wherein said means for storing and transferring is a magazine having means for selectively opening and closing a bottom opening thereof, such that when said bottom opening is selectively opened, said plurality of nested stacks of tips falls downwardly into the tip passage paths of said dispenser.

15. The dispenser recited in claim 14, wherein said opening and closing means comprises a removable bottom plate covering said bottom opening.

16. The dispenser recited in claim 2, wherein said means for storing and transferring is a magazine comprised of a three-sided frame wrapped in a light-weight cover, said frame and cover forming an internal cavity in which the plurality of tip stack layers reside.

17. The dispenser recited in claim 16, wherein said magazine comprises means to allow a group of tips of the multiplicity of tips to fit into the passage path of said dispenser when said cover material is removed and said dispenser and said magazine are coupled together.

18. A method for dispensing pipette tips downwardly under the force of gravity, said method comprising the steps of:

providing a dispenser with a plurality of apertures in a top plate;

loading each aperture with a plurality of tips in a mutually nested stack, the bottom tip in each stack extending through the apertures;

selectively preventing the tips from passing through the apertures in the top plate;

wedging apart the bottom tip from the next higher tip nested in the bottom tip so that the bottommost tip is retained in position while the remainder of the stack of tips is moved apart therefrom; and opening an aperture below the top plate, thereby permitting only the bottom tip to independently fall from the remaining tips in the nested stack in the apertures in said top plate.

19. A method recited in claim 18, and comprising the further step of providing a magazine adapted to mate with the dispenser adjacent the top plate thereof, the magazine having an internal cavity for storing therein a plurality of stacks of nested tips such that the dispenser is adapted to receive the plurality of stacks of nested tips from the magazine.

20. The method recited in claim 18, and comprising the further step of providing a tip storage rack below the dispenser, the storage rack having a plurality of apertures therein to receive a stack layer of tips from the dispenser in said opening step.

21. The method recited in claim 20, wherein the dispenser is repeatedly, sequentially positioned above subsequent empty tip storage racks after each storage rack is substantially full of tips.

22. The method of claim 21, wherein the opening step is repeated with other substantially empty storage racks until all of the multiplicity of tips are dispensed.

23. An apparatus for loading a multiplicity of pipette tips into tip storage racks having a matrix of a plurality of apertures therein, said apparatus comprising:

a dispenser having a frame with a top opening and a bottom opening spaced from said top opening;

a top plate having a matrix of a plurality of apertures therethrough;

a tip passage structure channel mounted between said top opening of said frame and said top plate, said tip passage structure having a like matrix of a plurality of internal tip passage paths, each path being adapted to be selectively opened and closed;

a plurality of tips in a mutually nested stack, the bottom one of said tips in each said stack extending through each said aperture in said top plate and into said tip passage path; and means in said tip passage structure for wedging apart the two bottom tips in each said nested stack, thereby raising the stack above the bottom tip in each stack while retaining the bottom tip in position, thereby permitting the bottom tip in each stack to pass through said tip passage path into said tip storage rack as a tip stack layer.

* * * * *